(12) United States Patent
Grunnet et al.

(10) Patent No.: US 10,690,116 B2
(45) Date of Patent: Jun. 23, 2020

(54) MULTI-ROTOR TURBINE ARRANGED FOR COORDINATED ROTATIONAL SPEEDS

(71) Applicant: VESTAS WIND SYSTEMS A/S, Aarhus N (DK)

(72) Inventors: Jacob Deleuran Grunnet, Tranbjerg J (DK); Erik Carl Lehnskov Miranda, Randers SV (DK); Michael Riis Krabbe, Struer (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 17 days.

(21) Appl. No.: 15/775,449

(22) PCT Filed: Nov. 18, 2016

(86) PCT No.: PCT/DK2016/050375
§ 371 (c)(1),
(2) Date: May 11, 2018

(87) PCT Pub. No.: WO2017/084676
PCT Pub. Date: May 26, 2017

(65) Prior Publication Data
US 2018/0347544 A1 Dec. 6, 2018

(30) Foreign Application Priority Data

Nov. 20, 2015 (DK) .................................. 2015 70747

(51) Int. Cl.
*F03D 9/00* (2016.01)
*H02P 9/00* (2006.01)
(Continued)

(52) U.S. Cl.
CPC ............. *F03D 7/0276* (2013.01); *F03D 1/02* (2013.01); *F03D 7/0296* (2013.01); *F03D 7/042* (2013.01);
(Continued)

(58) Field of Classification Search
CPC .................................. F03D 1/02; F03D 7/0296
See application file for complete search history.

(56) References Cited

U.S. PATENT DOCUMENTS 5,876,181 A * 3/1999 Shin .......................... F03D 1/06
415/2.1
8,193,656 B2 * 6/2012 Che ........................ F03B 13/264
290/54
(Continued)

FOREIGN PATENT DOCUMENTS

CN 101418776 A 4/2009
CN 104763589 A 7/2015
(Continued)

OTHER PUBLICATIONS

Chinese Office Action for Application No. 2016800744837 dated Apr. 16, 2019.
(Continued)

*Primary Examiner* — Tulsidas C Patel
*Assistant Examiner* — Thomas K Quigley
(74) *Attorney, Agent, or Firm* — Patterson + Sheridan LLP

(57) ABSTRACT

A wind turbine system is described comprising a plurality of wind turbine modules, each including a rotor, mounted to a support structure including a tower. In use, each rotor has an associated rotating unbalance that defines an unbalance vector. The wind turbine system includes control means configured to coordinate the rotational speeds of the plurality of rotors to attenuate oscillations of the support structure caused by the rotating unbalance of the rotors. Also described is a method of controlling such a wind turbine system. The method comprises coordinating the rotational
(Continued)

speeds of the plurality of rotors to attenuate oscillations of the support structure caused by the rotating unbalance of the rotors.

20 Claims, 5 Drawing Sheets

(51) Int. Cl.
    *F03D 7/02*     (2006.01)
    *F03D 1/02*     (2006.01)
    *F03D 7/04*     (2006.01)
    *G05B 19/042*     (2006.01)

(52) U.S. Cl.
    CPC .. *G05B 19/042* (2013.01); *F05B 2220/70646* (2013.01); *F05B 2240/912* (2013.01); *F05B 2260/966* (2013.01); *F05B 2270/1013* (2013.01); *F05B 2270/334* (2013.01); *G05B 2219/2619* (2013.01); *Y02E 10/723* (2013.01)

(56) References Cited

U.S. PATENT DOCUMENTS

| | | | | |
|---|---|---|---|---|
| 2007/0176428 | A1* | 8/2007 | Nagao | F03D 7/0296 290/44 |
| 2009/0008939 | A1* | 1/2009 | Pare | F03D 1/04 290/44 |
| 2011/0018279 | A1* | 1/2011 | Che | F03B 13/264 290/55 |
| 2013/0127173 | A1* | 5/2013 | Lee | F03D 1/02 290/55 |
| 2018/0017042 | A1* | 1/2018 | Baun | F03D 7/0224 |
| 2018/0023543 | A1* | 1/2018 | Kudsk | F03D 1/02 416/9 |
| 2018/0180022 | A1* | 6/2018 | Baun | F03D 7/0264 |
| 2018/0355847 | A1* | 12/2018 | Baun | F03D 7/0224 |

FOREIGN PATENT DOCUMENTS

| | | |
|---|---|---|
| EP | 1483502 A2 | 12/2004 |
| GB | 2443886 A | 5/2008 |
| JP | 2005351087 A | 12/2005 |
| WO | 2017084676 A1 | 5/2017 |

OTHER PUBLICATIONS

PCT International Search Report for Application No. PCT/DK2016/050375 dated Nov. 18, 2016.

PCT Written Opinion of the International Searching Authority for Application No. PCT/DK2016/050375 dated Nov. 18, 2016.

Danish Patent and Trademark Office First Technical Examination for Application No. PA 2015 70747 dated Jun. 15, 2016.

* cited by examiner

MULTI-ROTOR TURBINE ARRANGED FOR COORDINATED ROTATIONAL SPEEDS

TECHNICAL FIELD

The invention relates to a control system for a wind turbine system having multiple rotors and more particularly, but not exclusively, to an array-type, or multi-rotor, wind turbine system in which the separate rotors of the system may be aligned generally in a common plane.

BACKGROUND TO THE INVENTION

There exist a number of alternative wind turbine installation designs. One example is the multi-rotor array type wind turbine.

For example, EP1483501 B1 discloses a multi-rotor array-type wind turbine installation in which several co-planar rotors are mounted to a common support structure. Such a configuration achieves economies of scale that can be obtained with a very large single rotor turbine, but avoids the associated drawbacks such as high blade mass, scaled up power electronic components and so on. However, although such a co-planer multi-rotor wind turbine has significant advantages, it presents challenges to implement the concept in practice, particularly in how to control the multiple rotors to achieve optimum power production. EP1483501B1 approaches the control strategy by treating each wind turbine of the system as a separate item that is controlled individually.

It is against this background that the invention has been devised.

SUMMARY OF THE INVENTION

According to a first aspect of the invention, there is provided a wind turbine system comprising a plurality of wind turbine modules mounted to a support structure, the support structure including a tower. Each of the plurality of wind turbine modules includes a rotor and, in use, each rotor has an associated rotating unbalance that defines an unbalance vector. The wind turbine system comprises control means configured to coordinate the rotational speeds of the plurality of rotors to attenuate oscillations of the support structure caused by the rotating unbalance of the rotors.

This aspect of the invention provides a wind turbine system wherein the forces exerted on the support structure as a result of the rotating unbalances of the rotors are controlled using the rotor speed control function of the wind turbine modules. This allows oscillations of the support structure to be attenuated without limiting the freedom of operation of the wind turbine system, advantageously enabling operation of the wind turbine modules at critical rotation frequencies, close to the resonant frequency of the support structure.

In embodiments of the invention, there is a general aim to avoid the unbalance vectors of the rotors of the wind turbine system from rotating in phase such that the resulting cyclic forces coincide.

For example, the control means may be configured to coordinate the rotational speeds of a first rotor and a second rotor such that the angle between the unbalance vector of the first rotor and the unbalance vector of the second rotor varies. To achieve this, the control means may be configured to control the rotational speed of the first rotor to be different from the rotational speed of a second rotor. In particular, the control means may be configured to control the rotational speed of the first rotor such that the rotational speed of the first rotor is less than 98 percent of the rotational speed of the second rotor. Alternatively or additionally, the control means may be configured to control the rotational speed of the first rotor such that the rotational speed of the first rotor is more than 90 percent of the rotational speed of the second rotor. The control means may also be configured to control the rotational speed of the second rotor. The control means may be configured to control the rotational speed of the first rotor to be different from the rotational speed of at least one further rotor.

According to other embodiments of this aspect of the invention, the control means may be configured to coordinate the rotational speeds of a first rotor and a second rotor to achieve a target angular difference between an azimuth position of the first rotor and an azimuth position of a second rotor. The wind turbine system may comprise a sensor configured to detect vibrations within the support structure. In such cases, the control means may be configured to vary the target angular difference in dependence on the magnitude of the detected vibrations. The control system may be configured to determine the unbalance vector of the first rotor and the unbalance vector of the second rotor and the target angular difference may correspond to a non-zero angle between the first and second unbalance vectors. In such cases, the target angular difference may correspond to an angle between the first and second unbalance vectors of between 90 degrees and 240 degrees. More particularly, the target angular difference may correspond to an angle between the first and second unbalance vectors of 180 degrees.

According to a second aspect of the invention, there is provided a method of controlling a wind turbine system. The wind turbine system comprises a plurality of wind turbine modules mounted to a support structure including a tower. Each of the plurality of wind turbine modules includes a rotor. In use, each rotor has an associated rotating unbalance that defines an unbalance vector. The method comprises coordinating the rotational speeds of the plurality of rotors to attenuate oscillations of the support structure caused by the rotating unbalance of the rotors.

The method may comprise coordinating the rotational speeds of a first rotor and second rotor such that the angle between the unbalance vector of the first rotor and the unbalance vector of the second rotor is continuously varying. The method may comprise controlling the rotational speed of the first rotor to be different from the rotational speed of the second rotor.

The method may comprise coordinating the rotational speeds of a first rotor and a second rotor to achieve a target angular difference between an azimuth position of the first rotor and an azimuth position of a second rotor. In such cases, the method may comprise detecting vibrations within the support structure and varying the target angular difference in dependence on the magnitude of the detected vibrations. Alternatively or additionally, the method may comprise determining the unbalance vector of the first rotor and the unbalance vector of the second rotor and setting the target angular difference to correspond to a 180 degree angle between the first and second unbalance vectors.

According to a further aspect of the invention, there is provided a controller for a wind turbine system comprising a plurality of wind turbine modules mounted to a support structure including a tower. Each of the plurality of wind turbine modules includes a rotor and, in use, each rotor has an associated rotating unbalance that defines an unbalance vector. The controller comprises a processor, a memory module, and an input/output system, and the memory includes a set of program code instructions which when executed by the processor, implement a method according to the previously-described aspect.

According to another aspect of the invention, there is provided computer program product downloadable from a communication network and/or stored on a machine readable medium, the product comprising program code instructions for implementing a method in accordance with the second aspect of the invention.

For the purposes of this disclosure, it is to be understood that the control system described herein can comprise a control unit or computational device having one or more electronic processors. Such a system may comprise a single control unit or electronic controller or alternatively different functions of the controller(s) may be embodied in, or hosted in, different control units or controllers. As used herein, the term "control system" will be understood to include both a single control unit or controller and a plurality of control units or controllers collectively operating to provide the required control functionality. A set of instructions could be provided which, when executed, cause said controller(s) or control unit(s) to implement the control techniques described herein. The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

It should be noted that the accompanying figures are schematic representations to illustrate features of the invention and are not intended to be realistic representations or reflect the scale or relative proportions of the various components. The illustrated examples have been simplified for the purposes of clarity and to avoid unnecessary detail obscuring the principle form of the invention. The skilled person will appreciate that many more components may be included in a practical wind turbine system.

DETAILED DESCRIPTION OF EMBODIMENTS OF THE INVENTION

Figure 1:
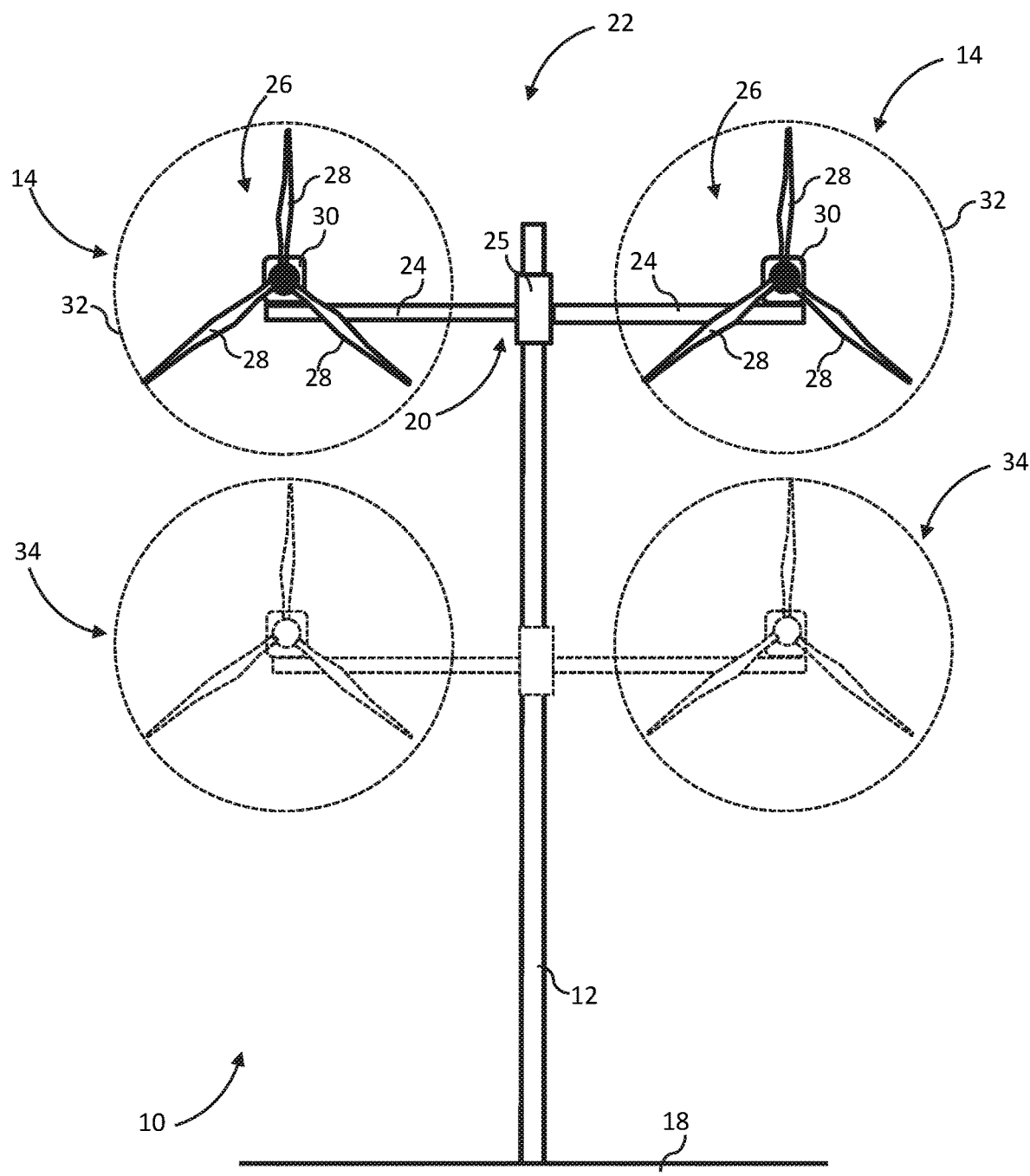
FIG. 1 is a front view of a multi-rotor wind turbine installation.

With reference to FIG. 1, a multi-rotor wind turbine installation 10 is shown including a tower 12 on which is mounted a plurality of wind turbines, or wind turbine modules 14. Note that the term 'wind turbine' is used here in the industry-accepted sense to refer mainly to the generating components of the wind turbine installation 10 and as being separate to the tower 12.

The entire wind turbine installation 10 is supported on a foundation, as is usual. As examples, the foundation may be a large mass buried in the ground 18, as shown here, or in the form of monopole or 'jacket' like structure.

The wind turbine modules 14 are mounted to the tower 12 by a support arm arrangement 20. Together, the tower 12 and the support arm arrangement 20 can be considered to be a support structure 22 of the wind turbine installation 10.

The support arm arrangement 20 comprises mutually opposed first and second support arms 24 extending generally horizontally from the tower 12, each support arm 24 carrying a respective wind turbine module 14 at its distal end. The support arms 24 are secured to the tower 12 at their proximal ends by a coupling 25. Alternative configurations are known, for example in which the turbine modules 14 are mounted centrally on the tower 12, one above the other, and where the support arm structures 20 are mounted at a different angle with respect to the tower 12.

The wind turbine modules 14 can be considered to be substantially identical, each including a rotor 26 comprising a set of blades 28 that is rotatably mounted to a nacelle 30 in the usual way. Thus, each of the wind turbine modules 14 is able to generate power from the flow of wind that passes through the area swept by the blades 28, known as the 'rotor disc' 32. However, in general wind turbine modules 14 with different specifications may be used, such as different rotor diameter and different generators.

In this example, each wind turbine module 14 is a three-bladed upwind horizontal-axis wind turbine module 14, in which the rotor 26 is at the front of the nacelle 30 and positioned to face the wind upstream of the support structure 22. Other configurations are possible; for example, different numbers of blades may be provided.

In this example, there are two wind turbine modules 14; however, the invention is equally applicable to multi-rotor wind turbine installations including more wind turbine modules. By way of example, an additional pair of wind turbine modules 34 is shown in dashed lines mounted to the tower 12, although for the purposes of this description, reference will only be made to two wind turbine modules 14.

Figure 2:
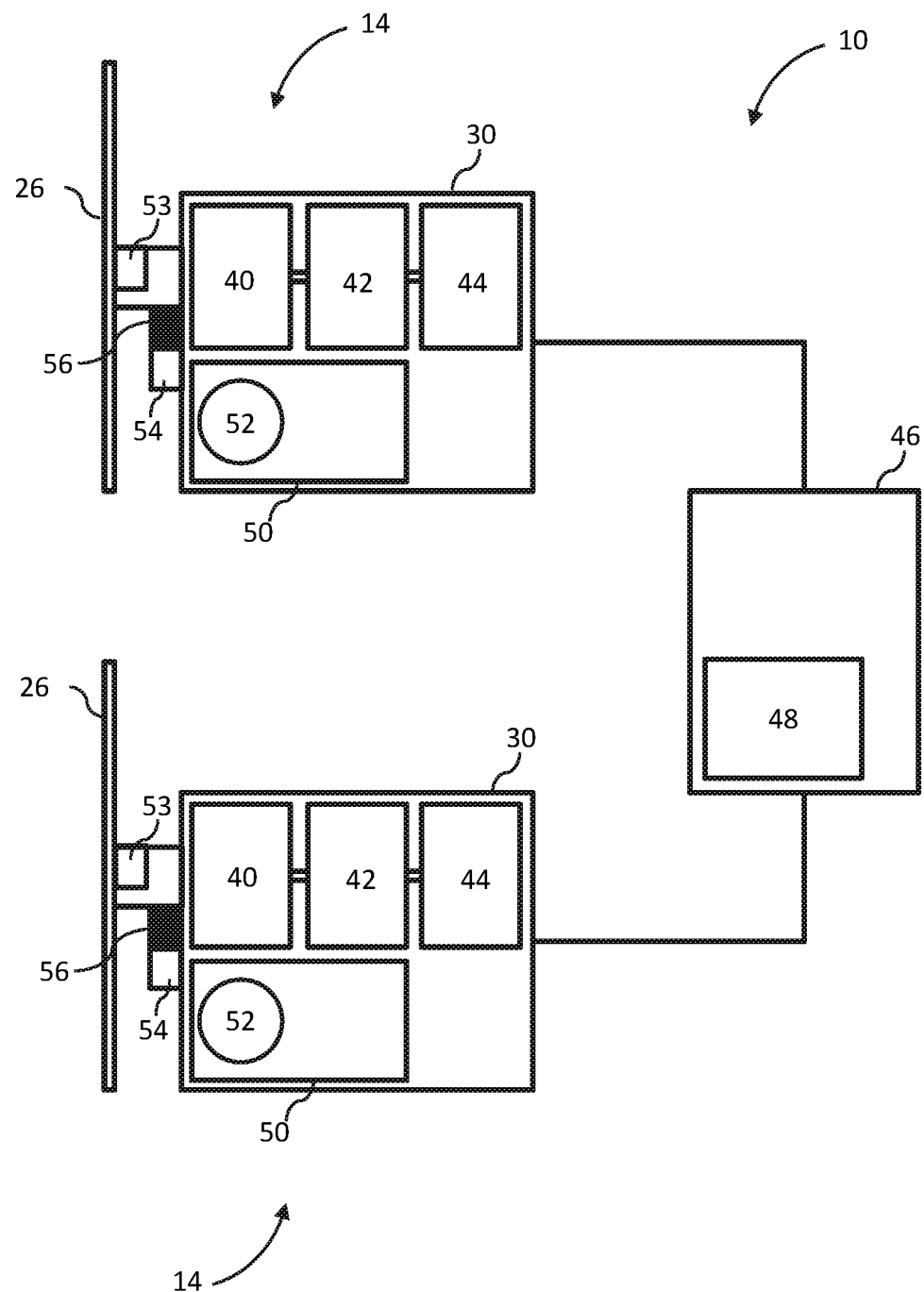
FIG. 2 is a schematic view of an example of a control system for the multi-rotor wind turbine installation of FIG. 1.

Further explanation will now be provided on the system components of the wind turbine installation 10 with reference to FIG. 2.

Each wind turbine module 14 is provided with a gearbox 40 that is driven by the rotor 26, and a power generation system including a generator 42 connected to the gearbox 40 and which feeds generated power to a converter system 44. The power output of the converter system 44 of each wind turbine module 14 is fed to a distribution unit 46 which allows for onward power transmission. In this example, the distribution unit 46 is located inside the tower 12, although it is envisaged that other locations would be acceptable. The precise configurations of these aspects of the wind turbine installation 10 are not central to the invention and will not be described in detail. For present purposes, these aspects can be considered to be conventional and, in one embodiment, may be based on a full scale converter (FSC) architecture or a doubly fed induction generator (DFIG) architecture, although other architectures would be known to the skilled person.

The wind turbine installation 10 also includes a control means configured to carry out a control process, described in more detail later, to ensure that excitation of the vibration modes of the support structure 22 is reduced, eliminated, or controlled to an acceptable level. In this embodiment, the control system includes a centralised control element and a localised control element.

The centralised control element serves a supervisory function in order to provide a coordinated control strategy. In this example, the centralised control element is provided by a central control module 48 in the form of a computing device incorporated in the distribution unit 46, having a suitable processor, memory module and input/output system. The central control module 48 is configured to monitor the operation of the wind turbine installation 10 as a whole in order to achieve a supervisory control objective.

The localised control element is operable to monitor and control respective ones of the plurality of wind turbine modules 14 to achieve a set of local control objectives. In this embodiment, the localised control element is provided in the form of a plurality of local control modules 50 that are embodied as respective computing devices each of which is dedicated to an associated wind turbine module 14 and comprises a suitable processor, memory module and input/output system. In other embodiments, the local control element of the control system may be provided as a single unit integrated with the centralised control element and may be located inside the tower 12, for example.

Each local control module 50 incorporates a speed controller 52 which is configured to control the rotor speed of the associated turbine module 14. To achieve this, the speed controller 52 is operable to control the converter system 44 to influence the torque exerted on the rotor 26 by the generator 42, and also to control the pitch of the blades 28 through a pitch control system 53 which adjusts the angle of attack of the blades 28 relative to the wind. The skilled person will be familiar with such systems for controlling the rotor speed of a wind turbine module 14, so a detailed explanation will not be provided here.

The input/output system allows the local control modules 50 to receive supervisory control commands from the central control module 48. In addition, the local control modules 50 also receive inputs from various sensors within the wind turbine installation 10. For example, each wind turbine module 14 includes a rotor speed sensor 54 which measures the rotational speed of the rotor 26 and provides this data to the associated local control module 50. Each local control module 50 also receives an input from an azimuth angle sensor 56 which measures the position of the rotor 26 of the associated wind turbine module 14 in the circumferential direction of the rotation axis between 0 and 360 degrees. Typically, the 'zero degree' position for a given rotor will be considered to be when a selected one of the blades 28 is in a vertically upwards position and the azimuth position is measured in the direction of rotation.

The skilled person will appreciate that many more components may be included in a practical wind turbine control system, as appropriate.

Reference will be made in the following description to a single rotor 26. It should be understood, however, that the description applies equally to both rotors 26.

Due to manufacturing tolerances, the centre of mass of the rotor 26 may not exactly coincide with the rotation axis, that is to say, the rotor 26 may have an associated unbalance. In practice, all wind turbine rotors exhibit some unbalance due to deviations in the profile and mass properties of the rotor blades 28, as well as differences in the blade pitch when the rotor is assembled. In addition, a change in rotor balance may occur over a period of use of the rotor 26, for example due to ice accretion or contamination which is not evenly distributed on the blades 28.

As the rotor 26 rotates, the centre of mass rotates around the rotation axis and the rotor 26 therefore exhibits a rotating unbalance.

The rotating unbalance can be described by an 'unbalance vector' which is defined to be the vector connecting the rotation axis of the rotor 26 to the centre of mass of the rotor 26. Since the direction of the unbalance vector corresponds to the position of the centre of mass, any reference in the following description to the direction of the unbalance vector of the rotor 26 can equally be understood to refer to the position of the centre of mass of the rotor 26.

The direction of an unbalance vector can conveniently be expressed as an angle between zero and 360 degrees, for example corresponding to the angle (in the direction of rotation of the rotor 26) between the vertical line and the direction of the unbalance vector. Since the unbalance vector rotates with the rotor 26, the angle of the unbalance vector is in fixed angular relation to the azimuth position of the rotor 26.

As the rotor 26 rotates, the support structure 22 experiences a cyclic force in the direction of the unbalance vector. If the rotational speed of the rotor 26 corresponds to a critical frequency, for example close to a resonant frequency of the support structure 22, then the cyclic force due to the rotating unbalance may excite a resonant vibration mode of the support structure 22. This may cause oscillations of the support structure 22 to increase, leading to fatigue which may impact the service life of the installation as a whole. To avoid this, a single rotor installation is typically not operated at its critical rotation speeds. However, this limits the freedom of operation of the wind turbine and can cause loss of power generation efficiency.

As will be described, the present invention identifies a solution to this problem in the context of multi-rotor wind turbine installations that enables operation at critical rotor speeds.

In embodiments of the invention, the rotor speed control function of the wind turbine modules 14 may be used to control the forces exerted on the support structure 22 as a result of the rotating unbalances. Thus, excitations of structural resonances of the system are controlled and oscillations of the support structure 22 are prevented from increasing to unacceptable levels of magnitude. That is to say, oscillations of the support structure 22 caused by the rotating unbalances of the rotors 26 are attenuated.

There are at least two control strategies that may be employed to achieve this, as will now be described by way of example. In each strategy, there is a general aim to avoid the centres of mass of the rotors 26 of the installation 10 from rotating in phase such that the resulting cyclic forces coincide, thereby amplifying each other and increasing resonance around the critical frequency.

In one strategy, the rotor speeds are controlled to maintain the unbalance vectors out of phase with one another such that the rotating unbalances of the rotors 26 apply opposing, i.e. counteracting, forces on the support structure 22, thereby neutralising one another to some extent and reducing the net cyclical excitation force on the support structure 22.

In another strategy, the wind turbine modules 14 are controlled so as to have differing rotor speeds, such that the rotating unbalances of the rotors 26 only exert a force in the same direction momentarily when the rotor unbalances are briefly in phase; that is, when the unbalance vectors are in the same direction. The forces therefore do not generally reinforce one another. The skilled person will be able to envisage other rotor speed control strategies that may be employed in order to attenuate oscillations of the support structure 22 caused by the rotating unbalance of the rotors 26.

An example of a rotor speed control process relating to the first strategy mentioned above will now be described with reference to FIGS. 3 and 4.

Figure 3:
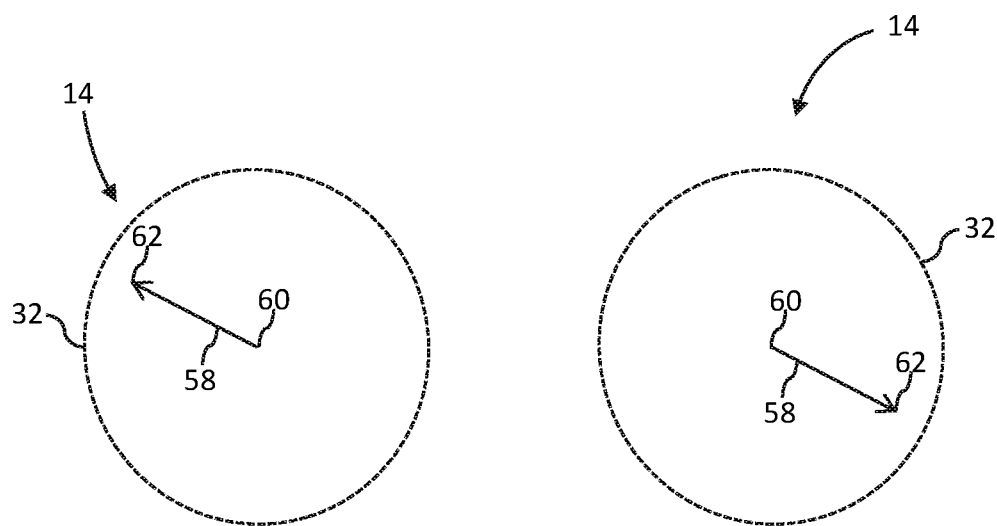
FIG. 3 is a schematic representation of the rotors of the wind turbine installation of FIG. 1.
Figure 4:
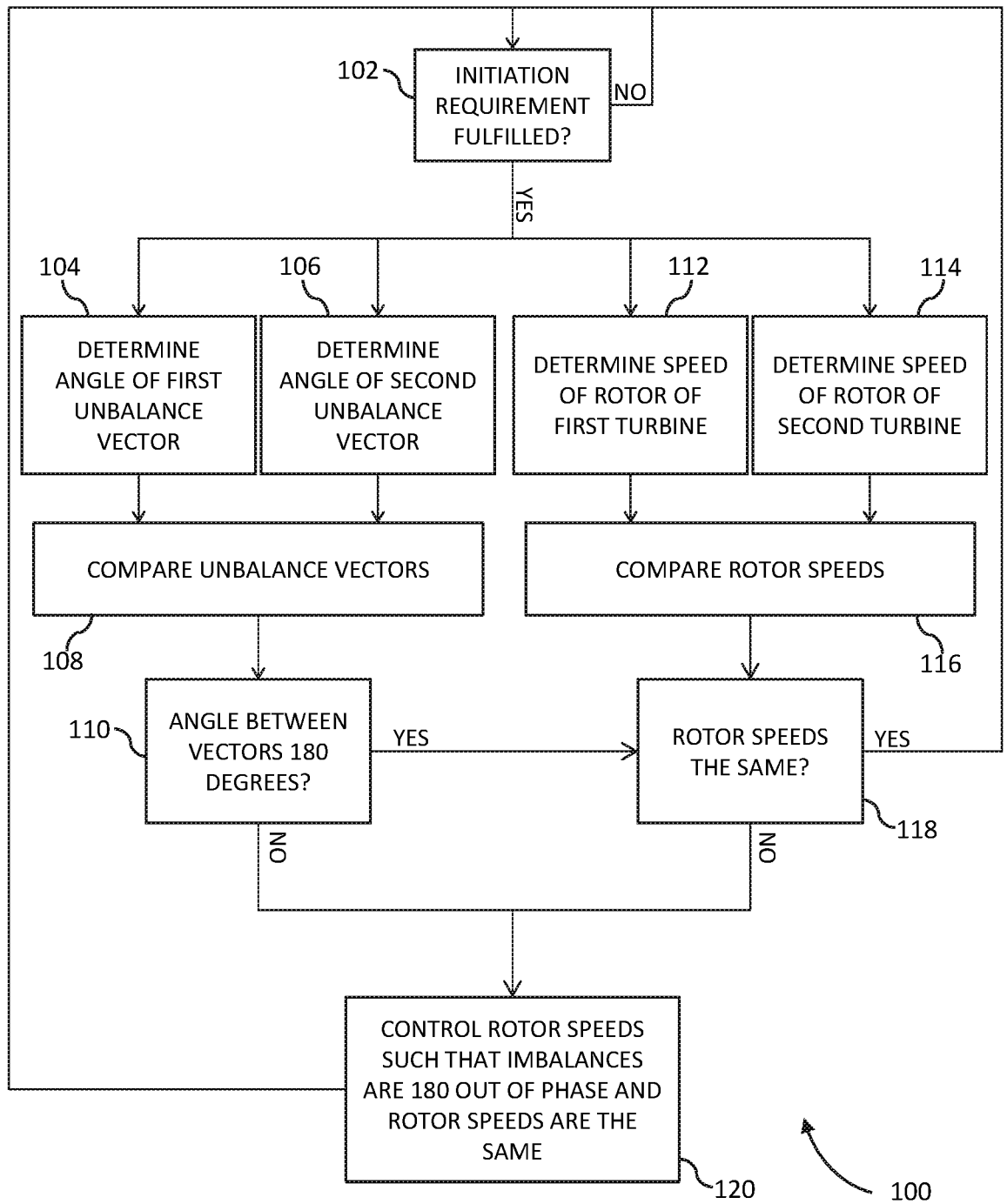
FIG. 4 is a flow diagram showing steps of a process that may be executed by the control system of FIG. 2.

FIG. 3 shows a schematic representation of the rotors 26 of the wind turbine installation 10. The unbalance vectors 58 of the rotors 26 are shown, extending between the rotation axis 60 and centre of mass 62 of the respective rotors 26. The turbine modules 14 are being controlled such that the rotor speeds of the two wind turbine modules 14 are the same, but the angle between the unbalance vectors 58 is 180 degrees.

In other embodiments, the wind turbine modules 14 may be controlled such that there is a different fixed angle between the unbalance vectors 58. In such embodiments, the forces exerted by the rotating unbalances are not strictly opposing (that is to say, they are not diametrically opposed); however, the forces are not in the same direction. Provided the angle between the unbalance vectors 58 is at least 90 degrees, the forces advantageously cancel each other to some extent.

An example of a process 100 that may be performed by the control system of the wind turbine installation 10 in order to achieve this control strategy will now be described with reference to FIG. 4. The skilled person will appreciate that various steps of the process may be carried out within the local control modules 50 or the central control module 48 as is appropriate.

Firstly, the control system determines, at step 102, if an initiation requirement that triggers the process to begin is satisfied. In some embodiments of the invention, the initiation requirement may be that the wind turbine installation 10 is operational; in such cases, the process 100 executes continuously during operation of the wind turbine installation 10. In other embodiments, the process 100 may be initiated when a sensing means such as a vibration sensor, or force sensor provided to the wind turbine installation 10 detects that a magnitude of vibration within the support structure 22 exceeds a predetermined threshold, indicating that a vibration mode is being excited. Alternatively, the process 100 may be initiated when the speed controller 52 issues a command that requires the rotor speed to correspond to a critical frequency of the support structure 22.

Following initiation of the process 100, the control system makes two comparisons between the two turbine modules 14: a comparison of the unbalance vectors 58 of the rotors 26, and a comparison of the rotor speeds. The process 100 includes a sequence of steps relating to each comparison. The steps relating to the comparison of the unbalance vectors 58 will be described first.

The angle of the unbalance vector 58 of the rotor 26 of the first turbine module 14, the 'first unbalance vector' 58, is determined at step 104. In this example, the angle of the first unbalance vector 58 is calculated from the azimuth angle of the first rotor 26, based on the fixed angular relationship between the azimuth angle of the first rotor 26 and the angle of the first unbalance vector 58. The angle between the azimuth position of the first rotor 26 and the angle of the first unbalance vector 58 is typically determined during commissioning of the wind turbine installation 10. Alternatively or additionally, the first rotor 26 may be designed, manufactured and installed with the centre of mass 62 positioned deliberately in a known angular relationship to the azimuth angle. In other embodiments, the angle of the first unbalance vector 58 is derived in operation through monitoring for cyclic loads in the support structure 22. The angle of the first unbalance vector 58 in relation to the azimuth angle of the first rotor 26 may be periodically or continuously monitored to account for changes in the balance of the first rotor 26 over a period of use.

The angle of the unbalance vector 58 of the rotor 26 of the second turbine module 14, the 'second unbalance vector' 58, is determined at step 106. Since the turbine modules 14 are substantially identical, the description of step 104 above equally applies to step 106. The skilled person will appreciate that either turbine module 14 may be designated the 'first' turbine module 14 and that steps 104 and 106 may be performed sequentially (in either order) or simultaneously.

The determined angles of the unbalance vectors 58 are compared at step 108 by calculating the angle from the first unbalance vector 58 to the second unbalance vector 58. It is subsequently determined, at step 110, whether the angle between the vectors is 180 degrees, completing the comparison between the unbalance vectors 58 of the two rotors 26. For the purposes of this process 100, the angle between the unbalance vectors 58 is also considered to be 180 degrees if the angle falls within a predefined tolerance region.

As mentioned above, the process 100 also includes a sequence of steps relating to the comparison of the rotor speeds of the two turbine modules 14. The rotor speeds of the two turbine modules 14 are respectively determined at steps 112 and 114. In this example, the rotor speeds are measured directly by the respective rotor speed sensors 54. However, the skilled person will be aware of other ways of determining the rotor speed of a wind turbine module 14, for example by calculation using various other operating parameters of the wind turbine module 14 such as the gearbox speed.

The rotor speeds are compared at step 116 and it is subsequently determined, at step 118, if the rotor speeds are the same. For the purposes of this process 100, the rotor speeds are also considered to be the same if they are within a predefined tolerance range of each other.

The turbine modules 14 are controlled on the basis of these comparisons. If the angle between the unbalance vectors 58 is 180 degrees and the rotor speeds are the same, then the rotating unbalances are counteracting one another appropriately, and so no additional rotor speed control is required and the process 100 is complete. The control system then returns to the initiation requirement step and the process 100 is reiterated continuously until the installation 10 is shut down.

However, if the angle between the unbalance vectors 58 is not 180 degrees, or if the rotor speeds are not the same (or both) then the control system issues, at step 120, an appropriate command to control the rotor speed of the first turbine module 14 such that the rotor speeds are equal and the angle between the unbalance vectors 58 is 180 degrees.

To achieve this, the control system commands the rotor 26 of the first turbine module 14 to undergo a speed adjustment operation. The speed adjustment operation may comprise a single acceleration or deceleration or a series of accelerations and/or decelerations of the rotor 26 as appropriate. The speed adjustment operation is appropriately composed to ensure that the rotor speeds become equal at a moment at which the angle between the unbalance vectors 58 is 180 degrees.

In other examples, the control system may also control the rotor speed of the second turbine module 14 to achieve the control strategy. In such cases, the control system may command the rotor 26 of the second wind turbine module 14 to undergo an appropriate rotor speed adjustment operation.

Following conclusion of the rotor speed adjustment operation(s), the control system issues a command to maintain equal rotor speed for each wind turbine module 14, ensuring that the forces exerted by the rotating unbalances remain opposed.

The control system then returns to the initiation requirement step 102. Accordingly, the control system acts to control the rotor speeds whenever the initiation requirement is met. So, in this example, the process executes 100 continuously when the wind turbine installation 10 is in operation.

The description above relates to one example of a possible process 100 that may be performed by the control system to ensure that the rotating unbalances of the rotors 26 apply opposing forces on the support structure 22 which cancel each other out to some extent. The skilled person will be able to envisage other appropriate processes that may be carried out. For example, an adaptive algorithm may be employed in which the rotor speeds are controlled to achieve a target angular difference between the azimuth positions of the first and second wind turbine module rotors 26, the target angular relationship being modified during operation until vibration detected within the support structure 22 is below a predetermined threshold.

Figure 5:
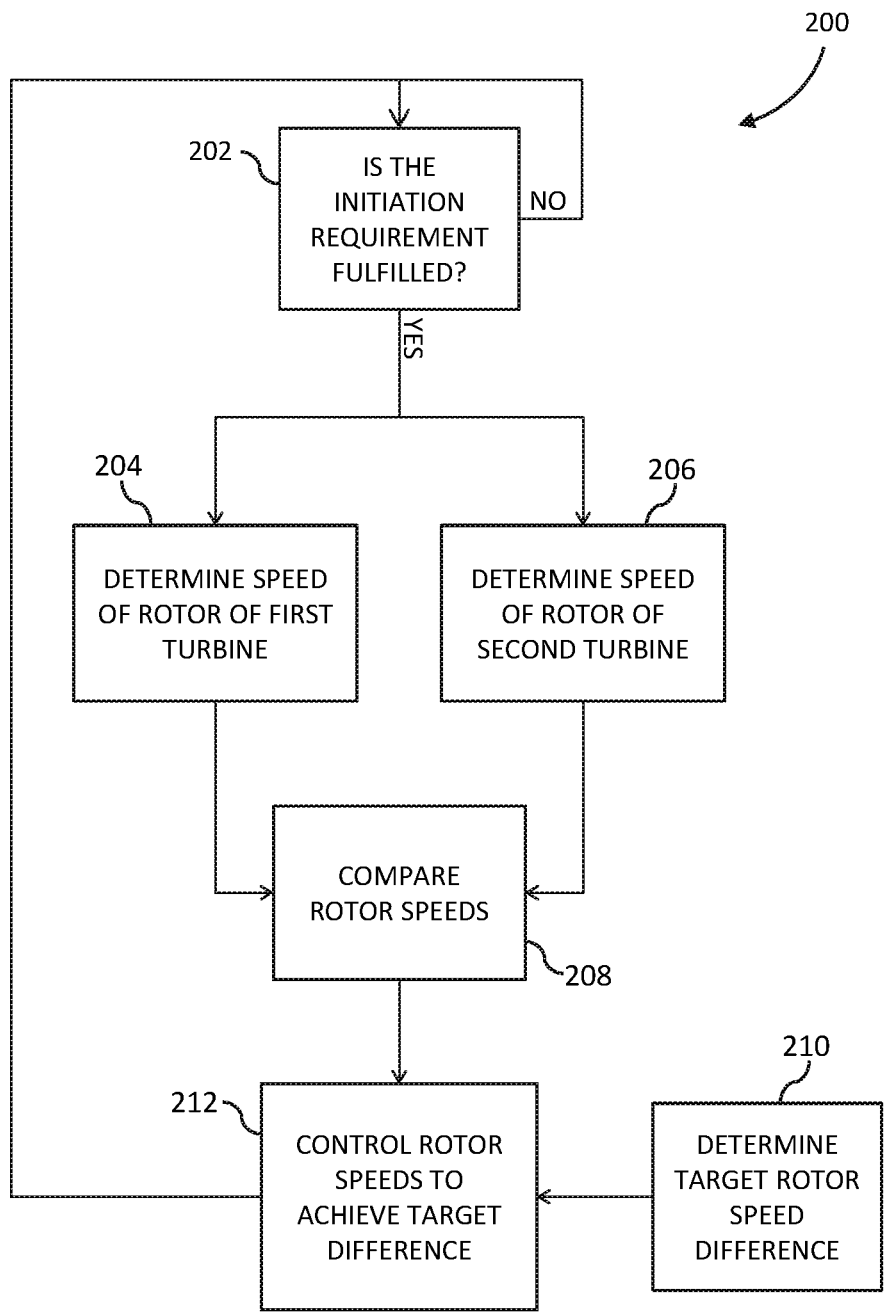
FIG. 5 is a flow diagram showing steps of another process that may be executed by the control system of FIG. 2.

As mentioned previously, an alternative strategy for using the rotor speed control functions of the turbine modules 14 to reduce or eliminate excitation of vibration modes of the installation 10 support structure 22 is to control the speeds of the rotors 26 such that they are different. The angle between the unbalance vectors 58 of the two rotors 26 is therefore continually changing and the forces due to the rotating unbalances will only be in phase momentarily. A process 200 that may be carried out by the control system in order to achieve this control strategy will now be described with reference to FIG. 5 which shows a flow diagram illustrating steps of the process 200.

The process 200 begins by checking at step 202 whether an initiation requirement is satisfied. This step generally corresponds to the initiation step 102 of the process 100 shown in FIG. 4, and the same considerations and alternatives apply. For example, in this embodiment the initiation requirement is that the wind turbine installation 10 is operational, but in other embodiments the method may be initiated when a vibration sensor provided to the wind turbine installation 10 detects that a magnitude of vibration within the support structure 22 exceeds a predetermined threshold, indicating that a vibration mode of the support structure 22 is being excited. Alternatively, the method may be initiated when the speed controller 52 issues a command that requires the rotor speed to correspond to a critical frequency of the support structure 22.

Following initiation of the process 200, the system determines, at step 204, the rotor speed of the first turbine module 14 and, at step 206, the rotor speed of the second turbine module 14. In this example, the rotor speeds are measured directly by the rotor speed sensors 54. However, the skilled person will be aware of other ways of determining the rotor speed of a wind turbine module 14, for example by calculation using various other operating parameters of the wind turbine module 14, for instance generator speed. The rotor speeds are compared at step 208.

Following this comparison, the turbine modules 14 are controlled such that the angle between the unbalance vectors 58 of the two rotors 26 varies continually. That is to say, the rotors 26 are set at different speeds.

In order to achieve this, the system determines, at step 208, a target rotor speed difference that defines the desired difference between the two rotor speeds in order to achieve the control strategy. In this example, the target rotor speed difference is a fixed percentage difference of four percent; that is, one rotor 26 rotating at 96 percent of the speed of the other rotor 26. The value of the percentage difference may be stored within a memory module of the control system as appropriate.

In other examples, the target percentage difference may take any other suitable value. In some examples of the process 100, the target percentage difference is more than two percent; that is, one rotor 26 rotating at less than 98 percent of the speed of the other rotor 26. Additionally or alternatively, the target percentage difference may be less than ten percent; that is, one rotor 26 rotating at more than 90 percent of the speed of the other rotor 26.

Generally speaking, a larger percentage difference advantageously reduces the period of time in any given rotation during which the forces due to the rotating unbalances are substantially reinforcing each other which minimises resonant excitation. However, there is a trade-off effect: the larger the percentage difference, the more the speed of one (or both) rotors 26 must deviate from the desired operating speed. This may affect the power generation efficiency of the wind turbine installation 10.

The skilled person will be able to envisage many possible definitions of the target rotor difference, for example based on one or more operating parameters of the wind turbine installation 10.

The system controls the rotor speeds, at step 210, in order to achieve the determined target rotor speed difference. That is to say, the control system issues a command for the rotor 26 of the first turbine module 14 to accelerate or decelerate as appropriate such that the rotor 26 of the first turbine rotates at 96 percent of the speed of the rotor 26 of the second turbine module 14. In other examples, the control system may also issue a command for the rotor of the second turbine module 14 to accelerate or decelerate as appropriate to achieve the target rotor speed difference.

Since the turbine modules 14 are substantially identical, either turbine module 14 may be designated to rotate at the faster speed. The control system determines target rotor speeds for each turbine module 14 based on the instantaneous local wind conditions. For example, the control system may determine that the rotor 26 of the turbine module 14 in the vicinity of which the wind speed is greater should rotate faster than the rotor 26 of the other turbine module 14. In other examples, the target rotor speeds may depend on various operating parameters of the wind turbine installation 10 as appropriate.

The control system then issues a command to maintain the target rotor speed difference between the wind turbine modules 14 and returns to the initiation requirement step 202.

The skilled person will appreciate that the description above relates to one example of a process 200 that may be carried out by the control system. Many modifications may be made to this example to provide alternative processes that ensure that the angle between the unbalance vectors 58 of the two rotors 26 varies. The angle varies continuously, but not necessarily smoothly, for example as would be achieved by a periodic step-change in rotor speed.

In addition, the control system may be operable to switch between control strategies, for example based on various operating parameters of the wind turbine installation 10 such as the wind speed. Thus, the most appropriate control strategy (and associated process) is implemented at any moment during operation of the wind turbine installation 10.

The skilled person will be able to envisage many other modifications that may be made to the above examples without departing from the scope of the present invention as defined in the accompanying claims.

As mentioned above, the present invention is also applicable to multi-rotor wind turbine installations including three or more wind turbines and the skilled person will appreciate that the above-described control strategies and processes can be adapted for such installations.

For example, in the context of a wind turbine installation 10 comprising four wind turbine modules 14, 34, as shown partially in dashed lines in FIG. 1, the upper wind turbine modules 14 may be controlled as described above whilst the lower wind turbine modules 34 are controlled separately according to a similar process. Thus, the wind turbine modules 14, 34 are controlled as two pairs in order to control the forces exerted on the support structure 22 as a result of the rotating unbalances of the rotors 26. Other wind turbine module pairings are also envisaged, for example, the left- and right-hand modules 14, 34 may each be controlled as a pair.

In other embodiments, the first control strategy described above can be adapted for the four-rotor wind turbine installation 10. For example, the rotor speeds of the wind turbine modules 14, 34 may be controlled such that the unbalance vectors 58 of the rotors 26 are equally spaced at 90 degree intervals. According to another control process, the target angular differences between the unbalance vectors 58 of the wind turbine modules may be determined based on the magnitudes of the unbalance vectors 58. This allows the target angular differences to be determined appropriately such that the forces on the support structure 22 due to the unbalance vectors neutralise one another as much as possible in order to minimise the cyclic excitation force exerted on the support structure 22.

The second above-described control strategy is also applicable to the four-rotor installation 10. For example, the four wind turbine modules 14, 34 may be controlled such that each module 14, 34 rotates at a different speed.

As described above, these control processes are similar in that there is a general aim to avoid the centres of mass of the rotors 26 of the installation 10 from rotating in phase such that the resulting cyclic forces coincide. The skilled person will be able to envisage further alternative control processes that may be employed to achieve this aim in the context of wind turbine installations 12 having any appropriate number of wind turbine modules 14.

In embodiments, the wind turbine modules are all configured to rotate in same direction, typically in the clockwise direction as is normal for single rotor turbines. However with multi-rotor turbine the is the possibility that a sub-group of the wind turbine modules are arranged for counter-clockwise rotation, so that one group of the wind turbine modules rotate in clockwise direction, whereas another group of the wind turbine modules are arranged to rotate in counter-clockwise rotation. In such a situation the embodiments of the present invention may take into account the rotational direction of the wind turbine modules so that the rotating unbalance vector includes the dimension of the rotating direction. Moreover, the control means is furthermore configured to coordinate the rotational speeds of the plurality of the rotors taking also the rotating direction of the unbalance vector into account.

The invention claimed is:

1. A wind turbine system comprising:
   a plurality of wind turbine modules mounted to a support structure including a tower, each of the plurality of wind turbine modules including a rotor, wherein, in use, each rotor has an associated rotational imbalance; and
   a control system comprising a processor, the control system configured to:
      determine, for each rotor, a respective imbalance vector corresponding to the associated rotational imbalance; and
      based on a comparison of the respective imbalance vectors, coordinate the rotational speeds of the rotors to attenuate oscillations of the support structure caused by the rotational imbalances associated with the rotors.

2. The wind turbine system of claim 1, wherein coordinating the rotational speeds of the rotors comprises:
   coordinating the rotational speeds of a first rotor and a second rotor such that an angle between the imbalance vector of the first rotor and the imbalance vector of the second rotor varies.

3. The wind turbine system of claim 2, wherein coordinating the rotational speeds of the rotors comprises controlling the rotational speed of the first rotor to be different from the rotational speed of the second rotor.

4. The wind turbine system of claim 3, wherein the rotational speed of the first rotor is less than 98 percent of the rotational speed of the second rotor.

5. The wind turbine system of claim 4, wherein the rotational speed of the first rotor is more than 90 percent of the rotational speed of the second rotor.

6. The wind turbine system of claim 3, wherein coordinating the rotational speeds of the rotors further comprises controlling the rotational speed of the second rotor.

7. The wind turbine system of claim 3, wherein coordinating the rotational speeds of the rotors comprises controlling the rotational speed of the first rotor to be different from a rotational speed of at least a third rotor of the wind turbine system.

8. The wind turbine system of claim 1, wherein coordinating the rotational speeds of the rotors comprises controlling the first rotor and the second rotor to achieve a target angular difference between an azimuth position of the first rotor and an azimuth position of a second rotor.

9. The wind turbine system of claim 8, further comprising:
   a sensor configured to detect vibrations within the support structure,
   wherein the control system is further configured to vary the target angular difference in dependence on a magnitude of the detected vibrations.

10. The wind turbine system of claim 8, wherein the the target angular difference corresponds to a non-zero angle between the imbalance vectors of the first rotor and the second rotor.

11. The wind turbine system of claim 10, wherein the target angular difference corresponds to an angle between 90 degrees and 240 degrees.

12. The wind turbine system of claim 11, wherein the target angular difference corresponds to an angle of 180 degrees.

13. A method of controlling a wind turbine system comprising a plurality of wind turbine modules mounted to a support structure including a tower, each of the plurality of wind turbine modules including a rotor, wherein, in use, each rotor has an associated rotational imbalance, the method comprising:
   determining, for each rotor, a respective imbalance vector corresponding to the associated rotational imbalance; and
   based on a comparison of the respective imbalance vectors, coordinating the rotational speeds of the rotors to attenuate oscillations of the support structure caused by the rotational imbalances associated with the rotors.

14. The method of claim 13, wherein coordinating the rotational speeds of the rotors comprises:
   coordinating the rotational speeds of a first rotor and a second rotor such that an angle between the imbalance vector of the first rotor and the imbalance vector of the second rotor is continuously varying.

15. The method of claim 14, wherein coordinating the rotational speeds of the rotors comprises controlling the rotational speed of the first rotor to be different from the rotational speed of the second rotor.

16. The method of claim 13, wherein coordinating the rotational speeds of the rotors comprises controlling the first rotor and the second rotor to achieve a target angular difference between an azimuth position of the first rotor and an azimuth position of a second rotor.

17. The method of claim 16, further comprising:
   detecting vibrations within the support structure; and
   varying the target angular difference in dependence on a magnitude of the detected vibrations.

18. The method of claim 16, further comprising:
   setting the target angular difference to correspond to a 180 degree angle between the imbalance vectors of the first rotor and the second rotor.

19. A controller for a wind turbine system comprising a plurality of wind turbine modules mounted to a support structure including a tower, each of the plurality of wind turbine modules including a rotor, wherein, in use, each rotor has an associated rotational imbalance, wherein the controller comprises:
   a processor; and
   a memory includes a set of program code instructions which when executed by the processor, perform an operation comprising:
      determining, for each rotor, a respective imbalance vector corresponding to the associated rotational imbalance; and
      based on a comparison of the respective imbalance vectors, coordinating the rotational speeds of the rotors to attenuate oscillations of the support structure caused by the rotational imbalance associated with the rotors.

20. A computer program product comprising a non-transitory computer-readable medium, the computer-readable medium comprising program code instructions which, when executed by one or more processors, perform an operation for controlling a plurality of rotors mounted to a support structure including a tower, each rotor having an associated rotational imbalance, the operation comprising:
   determining, for each rotor, a respective imbalance vector corresponding to the associated rotational imbalance; and
   based on a comparison of the respective imbalance vectors, coordinating the rotational speeds the rotors to attenuate oscillations of the support structure caused by the rotational imbalance associated with the rotors.

* * * * *